Figures 1, 2:
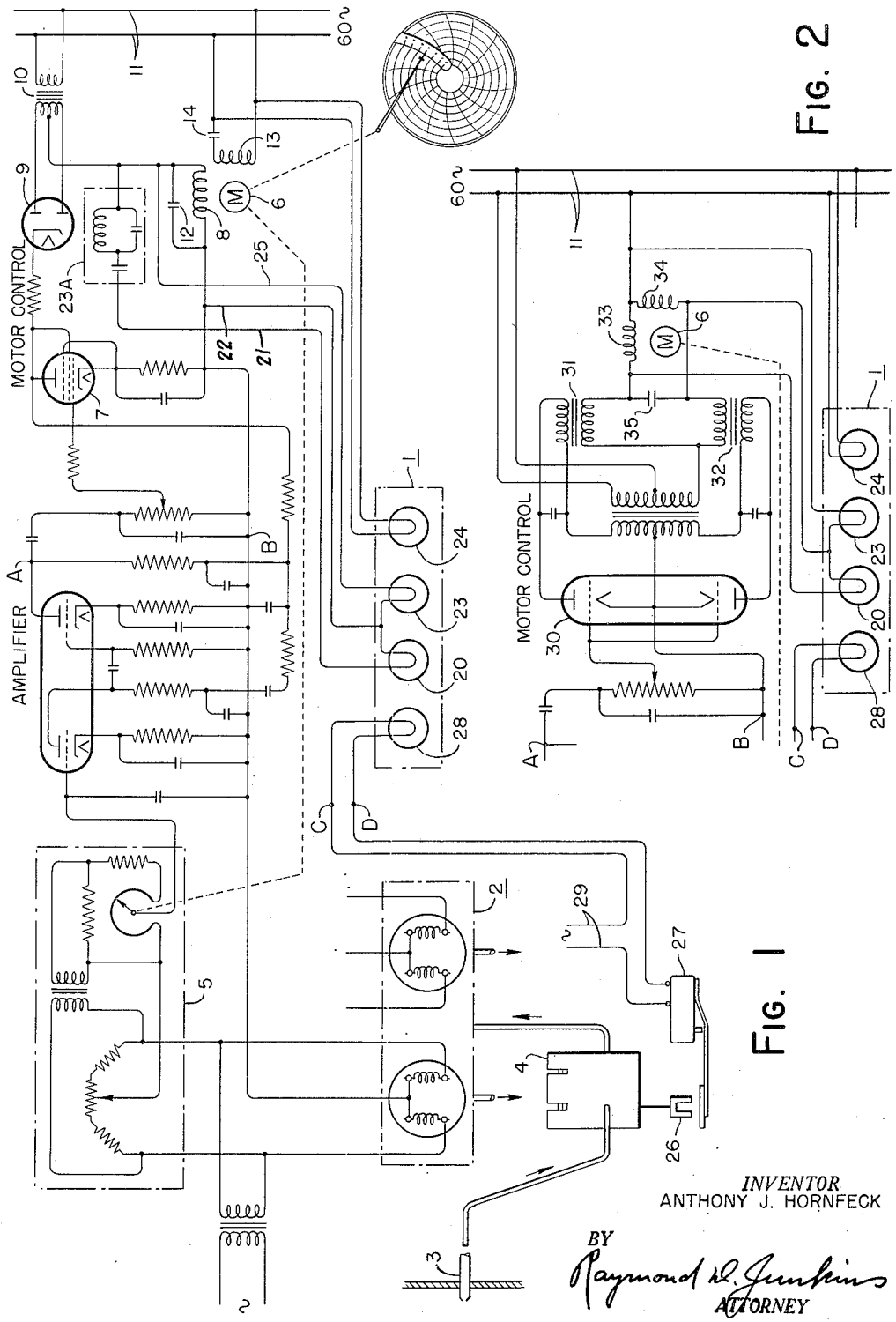

Aug. 28, 1956  A. J. HORNFECK  2,761,124
SUPERVISORY SYSTEM FOR CONDITION RESPONSIVE
MOTOR CONTROL INDICATOR
Filed Nov. 13, 1952

INVENTOR
ANTHONY J. HORNFECK
BY
Raymond D. Jenkins
ATTORNEY

United States Patent Office 2,761,124
Patented Aug. 28, 1956

2,761,124

SUPERVISORY SYSTEM FOR CONDITION RESPONSIVE MOTOR CONTROL INDICATOR

Anthony J. Hornfeck, South Euclid, Ohio, assignor to Bailey Meter Company, a corporation of Delaware Application November 13, 1952, Serial No. 320,305

5 Claims. (Cl. 340—213)

This invention relates to annunciation, alarm and control systems.

The increase in complication of electronic and fluid responsive and consumptive systems has steadily raised the need for readily available information concerning the nature and location of malfunctions in the systems. Monitory systems are finding places of increasing importance throughout industrial activities, particularly in the instrumentation and control phases of these activities.

Of course, if a monitory system is arranged to give a more or less continuous direction to the application of an agent in its effect on a condition it becomes, essentially, the final feedback loop of a complete control system. The present invention is directed in contradistinction, to fault detection of a system of apparatus and is not primarily intended to direct but to annunciate an occurrence of a malfunction of the apparatus. Nevertheless, it is within the scope of the present invention to actuate the apparatus in a predetermined direction toward a condition of fail-safe. It would be particularly desirable, of course, to provide for actuation toward a fail-safe condition if the apparatus to which the invention is applied is controlling a condition. It is presently proposed to either immobilize the control element or position this element toward an extreme of its range of operation which is predetermined to give the process or manufacture being controlled a maximum of protection or preservation.

However, it is generally the object of the present invention to provide, as an end result, a series of visual and/or audible annunciations of particular faults or malfunctions on a unitary panel for operator observation.

Another object is control of an agent in parallel with the annunciations of the malfunctions.

In the drawings:

Fig. 1 discloses a complete system of instrumentation embodying the present invention performing functions of annunciation.

Fig. 2 discloses those portions of the invention essential to specific adaptation to a particular form of electronic network.

In Fig. 1 there is disclosed the preferred embodiment of the present invention associated with a gas analyzing device that has been the subject of patent applications S. N. 209,952, filed February 8, 1951, now, Patent 2,652,315, and S. N. 320,323, filed November 13, 1952, both by James E. McEvoy. This specific analyzer actually represents any device which performs a function of indication and/or recordation of a variable condition, always with the possibility of control of the variable condition or one related to it in some way. The present invention is particularly directed to those devices which are continuous in function, and it is quite important, when a portion or all of their function is directed to control, that these devices be carefully monitored as far as the serviceable operation of their components is concerned. As was indicated supra, the supervisory apparatus which can keep a human operator informed of the appearance and precise nature of malfunctions is always a welcome addendum, particularly when the supervisory apparatus can combine ruggedness and simplicity of operation along with the ready understanding of its information, all of which is found in the present invention. Specifically, intelligence concerning functions and malfunctions is continuously presented for inspection by a system of annunciating lights upon the unitary panel 1. A catalytic gas analysis is performed within housing 2, and the results of this analysis are continuously exhibited through the agency of the electrical and electronic network disclosed, always with the possibility of actuation of a control element simultaneously with the exhibition.

More specific details of this type of gas analyzer disclosed here may be found in patents classified in the gas analysis art, aside from the specific applications filed by McEvoy, and referred to above. It is readily apparent from the disclosure that a sample of the gas to be analyzed is extracted from some locus by sample tube 3, included in well-known apparatus not shown here which cleans and generally prepares the extracted sample for analysis.

Prior to introduction of the sample into the analyzer, a regulator of the type disclosed and claimed in the patent to Johnson, 2,438,973 is located in the sampler as shown at 4. This regulator 4 passes all of the sample into the housing 2 of the analyzer and itself becomes an important location for detection of failure in the supply of the sample. Other fluids, compressed air, oxygen or hydrogen may be desirable or essential, to the particular analysis carried out in housing 2. Some or all of these fluid supplies may have a regulator similar to 4. Precisely how regulator 4 may be utilized by the present invention will be described subsequently.

For the present purposes, it is deemed sufficient to indicate merely that a balanceable electric network is disclosed at 5, to be unbalanced to an extent determined by the percentage of the analyzed constituent in the extracted sample. The unbalance of the network is compared to an adjusted voltage source, under the control of a motor 6 by reason of its rotation being prompted by the unbalance between the two voltages being amplified in direction and magnitude. This arrangement to provide a continuous balance is generally familiar in the art. Motor 6 is mechanically linked to an element of electric network 5 in order to oppose, cancel or eliminate the original unbalance and to simultaneously exhibit the balancing motion as the variable detected in housing 2 of the analyzer and/or control this variable or one associated with this variable.

The particular circuit indicated at 5 is disclosed and claimed in the Hornfeck Patent Number 2,612,628, and is shown here by way of example only. Two electronic motor control circuits are illustrated, the present preferred circuit in Fig. 1, and an older circuit including saturable reactors in Fig. 2.

The preferred electronic network of Fig. 1 was originally disclosed and claimed in Hornfeck 2,544,790. It appears desirable, for an understanding of the problems associated with applying the present invention to this specific electronic network, to trace down the essential description of the Hornfeck patent. In the first instance it must be appreciated that this electronic network is divided into two sections, one comprising a well-known and frequently disclosed two-stage amplifier (see Ryder 2,275,317) including a double-triode electronic tube, preferably of the 6SL7 type. The performance of this amplifying network is too well-known to need discussion in detail. Essentially a voltage representative of the unbalance of electric network 5 is introduced into the amplifier with the ultimate result that a reversal in phase of this signal voltage acts through the motor control circuit to effect an operation of the motor 6 in one direction or the other to vary an element in network 5 in proper sense to rebalance the system.

The output of the amplifier is imposed upon the motor control circuit which consists of a single tube 7, preferably of the high Gm or mutual conductance type, such as the 6AG7. This tube is connected in series with a control winding 8 of the motor 6. The plate voltage for the tube 7 is unfiltered pulsating D.-C. voltage obtained from a full wave rectifier tube 9 of the 6X5 type, receiving its power from a transformer 10 connected to the alternating current power source 11. The voltage output of the amplifier, produced by an unbalance of network 5, is applied to the control grid of the motor control tube 7. This will cause an increase in the plate current during the half-cycle when this applied voltage is in phase with the plate voltage and a decrease during the half-cycle the two voltages are out of phase. As a result, with a large grid signal, half-wave pulses of direct current will flow into the motor circuit comprised of the control winding 8 and the capacitor 12 in parallel. This relationship is shown by graphs in the Hornfeck patent. The phase of this pulsating current depends on the phase of the grid signal, and consequently on the direction of unbalance of electric network 5.

Motor 6 is in effect a two-phase motor which may be described as being a capacitor-run induction motor having a two-phase stator winding and a high resistance squirrel cage type rotor. There are two identical but separate windings 8, 13, the winding 13 being connected in series with a capacitor 14 across the A.-C. power line 11 so that its voltage leads the line voltage by nearly 90°. The capacitor 14 is chosen so that it is in resonance with the inductance of the winding 13 at the operating frequency and forms a series resonant circuit. This results in a voltage across the winding 13 which is approximately double the line voltage for the particular motor used.

The winding 8, which will be termed the control winding, while identical with the winding 13 in construction, differs in that it has capacitor 12 connected in parallel across it. The capacitor 12 is designed to produce a condition of parallel resonance at 60 cycles. The plate of the motor control tube 7 is always positive. At balance, some current flows during each half cycle of the applied plate voltage, but this current is pulsating direct current with no fundamental component of supply line frequency and consequently no output torque on the motor is produced. Any tendency of the rotor to coast is restrained by the damping action of the D.-C. component which applies a braking action. As balance is approached from an unbalance condition, there results a reduction in the fundamental component of supply line frequency in the output circuit of tube 7 and a consequent and simultaneous increase in the D.-C. component which produces a dynamic braking action and prevents overtravel.

With an unbalance occurring in electric network 5, the half-wave pulsating current which flows from the motor control tube 7 into the winding 8 and capacitor 12 has a large fundamental 60 cycle component, retaining, as well, higher frequency harmonic components and the D.-C. component which gives the braking action upon motor rotation. However, this parallel circuit is tuned so that the capacitor 12 is in resonance with winding 8 inductance for 60-cycles. This produces a large A.-C. voltage of 60-cycle frequency across the motor winding 8 but reduces the harmonics to a minimum since the parallel resonance circuit acts like a very high impedance to 60-cycle current, but a relatively low impedance to harmonics. In this arrangement the motor tube current may be only 12 milliamps. with 30 milliamps. or more alternating current in the control winding 8. This A.-C. control winding voltage lags or leads the main winding 13 voltage by approximately 90°, depending upon the phase of the control tube 7, grid voltage and direction of unbalance of the network 5. Consequently the motor 6 will run as a two-phase motor in a direction determined by the phase relationship of the winding voltages and actuate the balancing element of network 5.

Now in these, and similar structures, motors such as 6 may develop faulty bearings or other mechanical malfunctions which cause the motor operation to become sticky or even jam tight at some point of its travel. If this specific type of trouble occurs during a period of continuous employment of the analyzer, either for recordation or control purposes, it would become extremely desirable to reduce the delay between perception by the operator and control action for sending the control element to a position which will minimize the danger to a continuous process or manufacture associated with the analyzer. By long and practical association with the variables of these motor control circuits, a determination has been made of exactly where an annunciator circuit may be associated most simply and efficiently with the motor control circuit for providing a response to this particular type of malfunction.

It should be recalled that unbalance of network 5 eventually produces an A.-C. voltage of 60 cycle frequency across motor winding 8. Regardless of the other relationships throughout the network, this voltage in winding 8 will normally reach a predetermined limit before motor 6 is turned. However, should motor 6 be mechanically impeded from rotating under normal torque applied thereto, and this would result from a condition of stickiness, the voltage in winding 8 will continue to increase above its normally quite small maximum limit. This fact of voltage build-up from this specific malfunction is taken advantage of in the present invention. Essentially, a circuit including lamp 20 is placed across winding 8 by means of leads 21 and 22. A 120 frequency wave trap is provided in this circuit at 23A to prevent lamp 20 from being energized by anything other than the large A.-C. voltage of 60 cycle frequency which appears across the motor winding at the time the particular malfunction of stickiness appears. As a D.-C. voltage, with ripple, appears across winding 8 at motor rest, a large condenser has been included in 23A, in series with the 120-cycle wave trap, for preventing non-discriminating lamp 20 from being energized by any voltage other than the large A.-C. voltage of 60-cycle frequency.

The next condition of malfunction specifically detected is that of failure of motor control tube 7. For detection of this malfunction there is provided intelligence, transmitted by an observation of both lamps 23 and 24. Utilizing the lead 22, a circuit has been placed across winding 8 which includes lamp 23 and is completed through lead 25. As indicated supra, there always exists a voltage drop across winding 8, even at a condition of balance. With this fact of continuous current flow in winding 8, the system of the present invention provides a continuous energization for lamp 23 as long as tube 7, the other components of the electric network and the power supply are in normal operation. Of course failures other than that of tube 7 could occur which would atrophy the voltage in winding 8. However, tube 7 is, comparatively, the more vulnerable of these components and the presumption would be overwhelmingly in favor of its emissive failure having taken place.

Should interruption come about in the main power supply, evidenced in the disclosure by lines 11, provision has been made for a circuit including lamp 24 to be deenergized by this particular malfunction. With the circuits and lamps thus far disclosed, it is apparent that no malfunction in either comparatively delicate tube 7 or the main power supply will be taking place as long as both lamps 23 and 24 remain energized. Should the main power supply fail, both lamps 23 and 24 will be extinguished. Should only lamp 23 be extinguished, failure of motor tube 7 would be indicated. And further, should lamp 20 be energized, a mechanical impediment to the movement of motor 6 would be clearly indicated. Thus, at a glance, an operator may determine the precise character of malfunctioning of the more vulnerable components of the electronic network and motor controlled thereby. And it is further obvious that a system of relays could be included in these circuits of lamps 20, 23 and 24 to produce a control action which would safeguard the process of manufacture that may be associated with this instrumentation.

To render a more rounded and complete system of intelligence, upon panel 1, consideration has been given to the inclusion of annunciation upon the malfunction of fluid supplies to devices represented by the analyzer 2. It is initially recognized that there is generally associated with these fluid supplies a regulator, similar to 4 which has a part which moves to provide regulation and simultaneously furnishes some degree of mechanical power. In the particular regulator disclosed, the mechanical power is provided by a vertically reciprocable plunger which will fall to a predetermined minimum position upon failure of the fluid supply to regulator 4.

The complete system of the present invention utilizes the mechanical power available in the reciprocating plunger by attaching a magnet 26 to its lower end. The actuating arm of a switch 27 is placed at a position below the magnet 26 in order that when the fluid supplied reaches a predetermined minimum of pressure, allowing the magnet 26 to fall to a predetermined point in its range of travel, the actuating arm of switch 27 will be attracted and a circuit is completed between lamp 28 and power source 29. Of course the switch and magnet could be arranged so that the circuit of lamp 28 will be energized at any preselected point in the range of travel of the reciprocating plunger of 4. Further, it is obvious that a plurality of these regulators, similar to 4, could be connected so as to energize lamp 28 or individual lamps associated with each fluid supply. Again, the provision of relays in these circuits could give any required control action upon the fluid pressure failing or going to some undesirable value. Thus the present invention completes a panel of annunciators for the rapid conveyance of information pertaining to specific malfunctions in order that the malfunctions may be isolated and their exact nature and location determined.

In Fig. 2 there is disclosed another specific type of motor control circuit to which the invention is applied. I may employ exactly the same type of amplifier disclosed in Fig. 1. Therefore, only details of the circuit arrangements peculiar to this particular type of motor control circuit have been disclosed in detail in order to give the full explanation of how the invention cooperates therewith.

Although even the preferred arrangements of this particular type of motor control circuit have fluctuated from time to time, that disclosed in Fig. 6 of Hornfeck 2,529,450 has been utilized substantially, as a fairly acceptable form of the type. The motor will continue to be designated as 6, the motor tube failure lamp 23, the sticky motor lamp 20, power failure lamp 24, panel 1 and the power source 11. However, the circuit arrangement will now include a motor control tube 30, saturable core reactors 31, 32, stator windings 33, 34 and capacitor 35.

The arrangement in general provides a D.-C. control current for the two saturable core reactors 31, 32. These reactors are connected in the motor circuit in such a way that the speed of the rotor of the motor 6 depends on the degree of saturation of the reactors and the direction of rotation depends on which reactor is being saturated. The motor circuit loop comprises the output windings of the reactors 31, 32, the motor windings 33, 34 and the capacitor 35. The loop is provided with alternating current energy from a source by way of conductors 11. The saturated windings may, in the condition of equilibrium, be unsaturated, partially saturated or fully saturated. So long as the degree of saturation of the windings is equal, the motor control loop is in a steady state of equilibrium or balance. No rotation of the rotor of motor 6 occurs. Upon unbalance of the degree of saturation of the windings, i. e. with either the saturation of the one winding being decreased relative to the other or with the saturation of one winding being increased relative to the other, there will result the rotation of the rotor in a predetermined direction and at a speed determined by the unbalance of the output of the saturable core reactors, which is determined by the difference in degree of saturation of the windings. When the motor is rotating the capacitor 35 is effectively placed in series with either the winding 33 or with the winding 34 and the motor is termed a capacitor-run motor. Motor control tube 30 has its grids controlled from the amplifier circuit so as to control the saturation of the reactors 31, 32 for proper rotation of the motor. To understand the present invention, it is only necessary to be able to follow the circuit closely enough to comprehend how the energization of the motor windings 33, 34 come about.

Now to apply the present invention to this circuit of Fig. 2, lamp 20 has been included in a circuit placed across capacitor 35. After a fashion closely analogous to that of Fig. 1 the voltage across capacitor 35 will exceed a normally quite small maximum amount if, a mechanical impediment to the rotation of motor 6 appears. This voltage will reach a value predetermined to energize lamp 20 when the impediment is of a predetermined degree. As will be ascertained from a close study of Hornfeck 2,529,450, the voltage in the motor control loop will always exist across capacitor 35 no matter what the direction of rotation of motor 6. If the motor is retarded in either direction of rotation the voltage across 35 will increase until lamp 20 is energized.

The power failure lamp 24 is placed in a circuit across line 11. This is actually the arrangement given this lamp in the circuit of Fig. 1 and it is intended that the lamp here will also remain energized as long as power lines 11 are supplying the system.

The arrangement of lamp 23 in the circuit of Fig. 2 must be carefully considered in view of the exact import its energization will give. As can be observed from the disclosure of Fig. 2, lamp 23 has been placed in the circuit across motor winding 34. Placing lamp 23 across motor winding 33 would serve the same purpose as both windings are energized at all times, and during rotation only a phase difference exists between the voltages in the two windings.

It is intended that both sides of tube 30 will conduct current to some extent at all times, even at a condition of balance of the system. Correspondingly, there will always be a current flow through both the motor windings 33, 34, even during a condition of equilibrium. Therefore, as long as tube 30 has a generally high enough level of emission, lamp 23 will remain energized, regardless of which motor winding is included in its circuit.

The condition might next be contemplated where one side or the other of triode tube 30 is lowered from a normal level of emission, or the D.-C. windings of reactors 31, 32 burn out. First, should one side of tube 30 lower in emission, the reactor in the circuit of that side will have its impedance to the flow of current in its A.-C. windings raised considerably. Motor 6 will then rotate in a direction which will cause it to position the rebalancing element of circuit 5 toward a position which will cause the output from the amplifier section to make the plate of the active side of tube 30 negative to the extent that emission will be cut off from that active side. With the emission from both sides of tube 30 lowered, lamp 23 will turn off.

Secondly, if one of the reactors 31, 32 burns out its

D.-C. windings the impedance in that circuit will be raised and the motor will go to one extreme of its travel. The mechanical impedance of the limit stop of the motor will turn on lamp 20.

A caution must be emphasized because of the possibility that with either of the two types of failures just described the motor may or may not go up to a limit stop and turn on lamp 20 by build-up of voltage across capacitor 35. Should rotation of motor 6 be sufficient, in either failure, to drive the plate of the active side of the tube 30 sufficiently negative, from the measuring circuit, lamp 23 will be deenergized and motor 6 may not have reached its limit stop, and built up sufficient voltage across capacitor 35 to turn on lamp 20. Generally, the range of operation of the tubes and saturable reactors is such that complete failure of one side of tube 30 or burn-out of one reactor will send the motor against a limit stop for energization of lamp 20. It would be possible that a lamp across each of the motor windings may be desired to further refine the analysis of the energization of each motor winding.

The invention is obviously not limited in its scope to the specific arrangement illustrated.

What I claim as new, and desire to secure by Letters Patent of the United States, is:

1. In association with an electric amplifying and motor control circuit of a measuring system wherein a motor is directed in its rotation through an electronic tube included directly in at least one winding of the motor to positions indicative of variations in a variable, and wherein one winding is at all times carrying pulsating current from the tube cathode circuit, a circuit system responsive to malfunctions including, a first circuit spanning the last mentioned winding of the motor whereby the circuit is effectively energized when the motor control electronic tube is delivering cathode current to the motor, a second normally deenergized circuit associated with the motor winding whereby it will be energized when the motor is mechanically impeded a predetermined degree when energized for rotation under direction of the motor control electronic tube, and means associated with each circuit for annunciating in unison the malfunctions of the motor control circuit.

2. The circuit system of claim 1 in which the electronic tube cathode circuit is arranged to be simultaneously and separately in series with a winding of the motor and a capacitor connected in shunt across the motor winding which arrangement provides that voltage build-up in either direction across the capacitor due to mechanical impediment to motor rotation in either direction will energize the second circuit.

3. The circuit system of claim 2 in which the second circuit responsive to malfunctions includes a capacitor and a wave-trap for harmonics greater than the frequency of the supply circuit.

4. In association with an electric amplifying and motor control circuit of a measuring system wherein a motor is directed in its rotation through an electronic tube in circuit with at least one winding of the motor to positions indicative of variations in a variable, a circuit system responsive to malfunctions including, a first circuit associated with a winding of the motor and responsive to the operation of the motor control electronic tube, a second circuit responsive to the potential in a winding of the motor and energized by a predetermined degree of impediment to the mechanical movement of the balancing motor directed by the motor control electronic tube, an annunciator for each circuit, and a panel for the annunciating devices upon which the devices are arranged in individual and comparative relationship for ready ascertainment of the location and nature of specific malfunctions in the measuring system.

5. The circuit of claim 4 in which the electronic tube controls saturable core reactors through which the motor is positioned as a capacitor-run motor and the potential build-up across the motor winding is due to the mechanical impediment and energizes the second circuit.

References Cited in the file of this patent

UNITED STATES PATENTS

| | | |
|---|---|---|
| 1,690,243 | Parrish | Nov. 6, 1928 |
| 2,116,947 | Ketay | May 10, 1938 |
| 2,345,772 | Robertson et al. | Apr. 4, 1944 |
| 2,452,023 | Wild | Oct. 19, 1948 |
| 2,473,314 | Toulon | June 14, 1949 |
| 2,620,385 | Grant | Dec. 2, 1952 |
| 2,639,418 | Sundstrom et al. | May 19, 1953 |